(12) United States Patent
Barkan et al.

(10) Patent No.: US 6,766,954 B2
(45) Date of Patent: Jul. 27, 2004

(54) OMNIDIRECTIONAL LINEAR SENSOR-BASED CODE READING ENGINES

(75) Inventors: Edward Barkan, Miller Place, NY (US); Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 108 days.

(21) Appl. No.: 09/880,899

(22) Filed: Jun. 15, 2001

(65) Prior Publication Data

US 2003/0029915 A1 Feb. 13, 2003

(51) Int. Cl.[7] ................................................. G06K 7/10
(52) U.S. Cl. ........................ 235/462.42; 235/462.01; 235/462.08; 235/462.9; 235/462.2; 235/462.32; 235/462.43
(58) Field of Search ...................... 235/462.01, 462.08, 235/462.09, 462.2, 462.32, 462.42, 462.43, 454, 462.1, 462.24, 462.41, 472.01, 462.45, 462.17

(56) References Cited

U.S. PATENT DOCUMENTS

| | | | |
|---|---|---|---|
| 4,182,481 A | * | 1/1980 | Maussion ............... 235/462.17 |
| 5,144,448 A | * | 9/1992 | Hornbaker et al. ......... 348/324 |
| 5,153,929 A | * | 10/1992 | Itagaki ...................... 382/323 |
| 5,168,149 A | | 12/1992 | Dvorkis et al. |
| 5,436,440 A | | 7/1995 | Barkan |
| 5,495,097 A | | 2/1996 | Katz et al. |
| 5,561,283 A | | 10/1996 | Dvorkis et al. |
| 5,581,070 A | | 12/1996 | Dvorkis et al. |
| 5,610,884 A | * | 3/1997 | Yanagidate ................ 235/454 |
| 5,614,706 A | | 3/1997 | Bard et al. |
| 5,621,371 A | | 4/1997 | Dvorkis et al. |
| 5,635,700 A | * | 6/1997 | Fazekas ................... 235/462.6 |
| 5,703,349 A | | 12/1997 | Meyerson et al. |
| 5,705,800 A | | 1/1998 | Dvorkis et al. |
| 5,814,827 A | * | 9/1998 | Katz ...................... 235/472.01 |
| 5,818,028 A | * | 10/1998 | Meyerson et al. ...... 235/472.01 |
| 5,914,478 A | | 6/1999 | Bridgelall |
| 5,920,061 A | * | 7/1999 | Feng ...................... 235/462.42 |
| 5,925,872 A | | 7/1999 | Wyatt et al. |
| 5,955,720 A | | 9/1999 | He et al. |
| 6,053,413 A | | 4/2000 | Swift et al. |
| 6,075,883 A | * | 6/2000 | Stern et al. ................. 382/144 |
| 6,138,915 A | | 10/2000 | Danielson et al. |
| 6,216,951 B1 | | 4/2001 | Swift et al. |
| 6,247,647 B1 | | 6/2001 | Courtney et al. |
| 6,283,372 B1 | | 9/2001 | Li |
| 6,348,773 B1 | | 2/2002 | Dvorkis et al. |
| 6,454,167 B1 | | 9/2002 | Barkan et al. |
| 6,491,222 B1 | | 12/2002 | Dvorkis et al. |
| 6,603,874 B1 | * | 8/2003 | Stern et al. ................. 382/144 |

* cited by examiner

*Primary Examiner*—Michael G. Lee
*Assistant Examiner*—Ahshik Kim

(57) ABSTRACT

An omnidirectional optical code reader employs two or more line photo sensor arrays orientated at an angle to one another. Electrical signals from the photo sensor arrays may be converted to digital signals by circuitry located on the die of each of the line photo sensors. Code reader circuitry is located on a circuit board orientated vertically in a backwardly sloping handle of a gun-shaped housing.

31 Claims, 8 Drawing Sheets

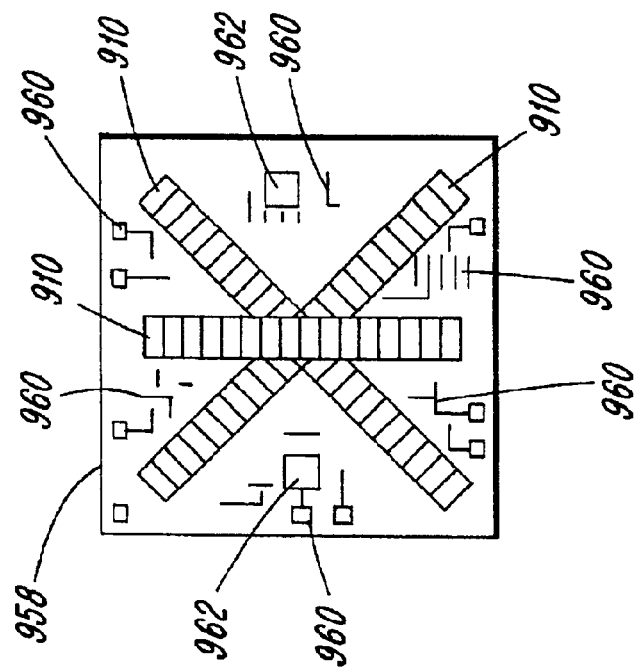
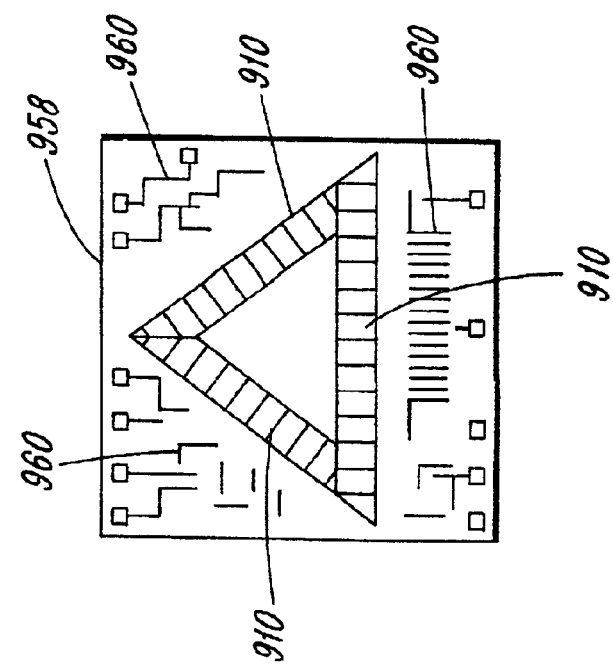

OMNIDIRECTIONAL LINEAR SENSOR-BASED CODE READING ENGINES

FIELD OF THE INVENTION

The invention relates to systems and methods using solid state sensors for reading of optical codes such as UPC code.

BACKGROUND OF THE INVENTION AND OBJECTS

Optical codes are patterns made up of image areas having different light reflective or light emissive properties, which are typically assembled in accordance with a priori rules. The term "bar code" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional bar code symbols. The bar code is a pattern of variable-width rectangular bars separated by fixed or variable width spaces. The bars and spaces have different light reflecting characteristics. One example of a one dimensional bar code is the UPC/EAN code used to identify, for example, product inventory.

Bar codes can be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two-dimensional array of pixel information for a field of view. A one-dimensional linear array of photodiodes is also known for use in detecting a bar code reflection image. See, e.g., U.S. Pat. No. 6,138,915 to Danielson et al.

It is known in the art to use a CCD photo detector and objective lens assembly in an optical code reader. In the past, such systems have employed complex objective lens assemblies originally designed for use in relatively expensive video imaging systems. Such systems may have a single sharp focus and a limited depth of field, which along with conventional aiming, illumination and signal processing and decoding algorithms, limits the versatility and working range of the system.

Other known imaging systems are designed primarily for reading optical codes. Such reading systems involve the assembly and alignment of several small parts. These parts may include a lens, an aperture and a 2D optical detector array such as a CCD chip. Such a structure is illustrated, for example, in U.S. patent application Ser. No. 09/096,578 for Imaging Engine and Method for Code Readers to Correa et al. filed Jun. 12, 1998 and assigned to Symbol Technologies, Inc. The Correa et al. application is hereby incorporated by reference herein.

It is an object of the present invention to further reduce the expense and difficulty associated with providing an optical code reading system.

It is known to provide illumination in optical code readers by employing illuminating devices to supplement ambient light. For example, U.S. Pat. No. 5,703,349 discloses an illumination module comprised of two lines of illuminating LEDs and lens cells. The above mentioned Correa et al. patent application also discloses an illumination system for a hand held optical code imager.

Existing one-dimensional imaging systems utilize off-the-shelf linear CCD detectors. A typical linear detector contains a few thousand pixels and has a total image length of about 28 mm. The focal length for a system using such a detector is approximately 38 mm assuming a field of view of 40 degrees. With a 0.4 mm wide by 6.2 mm high aperture the effective F-number (for light throughput) of the system is 21.4. Significant illumination is required for reasonable performance with such a system, and the device cannot be miniaturized.

It is a further object of the present invention to provide improved miniaturized code readers using one-dimensional solid state sensors.

Conventional code readers using one-dimensional sensor array require the code reader to be oriented so that the array is approximately parallel to the principle axis of the code being read. This may present problems during use in that the target object and/or the code reader may need to be realigned to produce a successful code reading.

It is a further object of the present invention to improve the ease with which a code reader which uses one-dimensional sensor technology can be aimed and aligned.

Conventional sensor array based code readers have employed a gun-shaped housing. However, such systems have required a relatively complex arrangement of circuit interconnections.

It is a further object of the present invention to interconnect and carry most or all of the circuit elements of a code reader on a single circuit board located in a gun-shaped housing.

These and other objects and features of the invention will be apparent from this written description and the drawings.

SUMMARY OF THE INVENTION

The present invention relates to apparatus useful in optical code readers.

One-dimensional solid state photo sensor arrays may be employed in these code readers. The terms "one-dimensional" and "line" when used to describe arrays and sensors are intended to include linear arrangements of sensor cells including curved, segmented or straight lines of sensors cells. In preferred embodiments the arrays may contain relatively low numbers of cells for example about 1000 (e.g. a 1024 cell array) or about 500 (e.g. a 512 cell array), arranged in a straight line.

Systems of the present invention are particularly well adapted for reading a target one-dimensional optical code symbol whose principle axis has an arbitrary orientation in a plane generally parallel to an image plane of the sensor assembly. The system may include two or more photo sensor arrays each having cells arranged in a line, where the lines of the arrays are oriented at an angle to one another. This arrangement permits omni directional reading of one-dimensional optical code symbols. In order to read the code, the code reader is pointed at the code symbol so that the optical axis of the code reader is roughly perpendicular to a plane of the surface on which the symbol appears, but without regard to the orientation of the symbol in that plane.

A particularly preferred embodiment of the present invention employs three solid state photo sensor arrays each having cells arranged in a generally straight line are employed. The arrays produce electronic signals corresponding to at least a portion of the code symbol. The lines of the three arrays are oriented at an angle with respect to one another, preferably a 60° angle.

A focusing system, such as a lens associated with each array, may be used to focus an image on each array. Where the focusing system includes three lenses, each one may have an optical axis which approximately intersects a mid point of the line of its respective photo sensor array.

The assembly may also include an electronic system for converting to digital form the electronic signals from the one of the sensor array whose line is most closely aligned with the principle axis of the target code symbol. Such an electronic system may include a sensor processor and software performing the function of a high blur digitizer. The selection of the data derived from the electronic signal from a particular one or ones of the sensors arrays may be made by attempting to digitize and decode electronic signals from each of the sensor arrays and using data from the first successful decode.

In one embodiment, each photo sensor array and processing circuitry is formed on a separately encapsulated semiconductor die. In another embodiment the plural photo sensor arrays are formed on the same die. The supporting circuitry for the photo sensor arrays may be located in the space on the die adjacent or between the arrays.

The assembly of preferred embodiments of the present invention may include solid state devices for producing an aiming beam for providing a reference spot on the target optical code symbol to be read. Advantageously, the aiming beam producing devices and the photo sensor arrays are carried on the same lead frame or circuit board. Advantageously, the aiming beam portion of the assembly comprises at least two LEDs and associated lenses for producing beams which converge to form a reference spot at a preferred focal distance for reading the target optical code symbol.

Systems of the present invention employ an optical assembly (typically an objective lens and aperture) for focusing light from a target optical code symbol on photo sensor arrays. Advantageously, the optical assembly has an F-number less than 8, preferably less than 5, more preferably less than about 3. An electronic digitizer may be implemented with a microprocessor and software for converting electrical signals to bit content for the target symbol. In preferred embodiments the digitizer is sufficiently powerful to extract bit content from a target symbol where the number of modules represented in the image focused on the photo sensor is less than or equal to the number of cells of the photo sensor. These systems may advantageously be incorporated in a miniature package having, for example, a focal length less than 5 mm and an overall volume of less than one cubic centimeter.

In a preferred embodiment of the present invention, the sensors and circuitry of the code reader are carried and interconnected by a single circuit board contained in a gun-shaped housing. The circuit board extends vertically through a head of the housing and through a backwardly and downwardly sloping handle portion of the housing. Advantageously, the circuit board carries one or more sensor arrays which define an optical axis of the sensor system. A principle plane of the circuit board is oriented substantially perpendicular to the optical axis and at an acute angle with respect to the backwardly and downwardly sloping handle portion of the housing. At least one interface connector for the code reader may be located at the lower end of the handle portion and circuit board.

The foregoing is intended as a convenient summary of the present disclosure. However, the aspects of the invention sought to be protected are set forth in the claims.

BRIEF DESCRIPTION OF THE DRAWINGS

FIGS. 10(a)–(b) are examples of embodiments of the present invention where multiple line sensors and supporting circuitry and formed on the same semiconductor die.

DETAILED DESCRIPTION

I. Molded Optical Package

Figure 1:
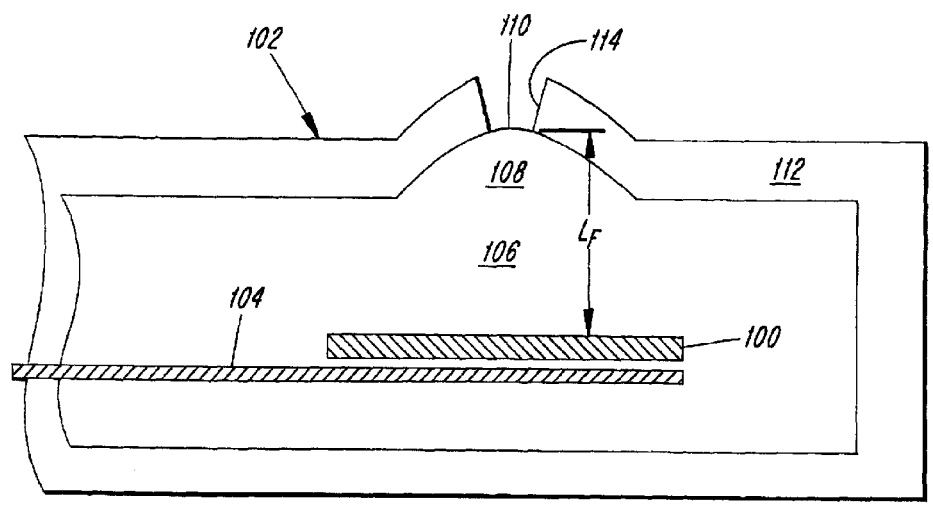
FIG. 1 is a cross-sectional view of a molded imager optical package in accordance with a preferred embodiment of the present invention.

Embodiments of the present invention include imaging code readers and cameras in which a solid state photo sensor with the capacity to detect an array of pixels, is encapsulated in a package. Portions of the package function as an objective lens, aperture and stabilizing medium for maintaining the proper separation between the semiconductor die or chip and the integrally molded lens to provide the desired (usually short) focal length for the system.

In this invention, injection molded packaging for the semiconductor device provides optical functions such as lens and aperture that are not included in conventional molded packages. This approach may be used in optical code readers, cameras, solid state illuminators or single package combinations of the foregoing.

In a camera or code imaging system, a solid state photo sensor die 100, is fabricated by conventional means (for example, using CMOS techniques) and encapsulated in package 102. This photo sensor may have a one-dimensional line of cells for a linear bar code reader or may have cells in a two-dimensional area array suitable for imaging one-dimensional or two-dimensional optical codes or video images of objects or scenes. These devices may also include analog and/or digital signal processing circuitry for performing the additional functions required of a bar code scanner system or camera: exposure control, signal conditioning, digitizing, and decoding.

During fabrication the die 100 may be mounted on a lead frame 104, again using conventional means such as soldering and wire bonding or direct lead frame bonding to the die. Such mounting mechanically attaches and electrically connects the die to the lead frame. This assembly is then placed into a mold cavity for injection molding of a first compound 106. The first compound is clear or has high light transmissivity for the wavelengths of interest. This material also may have a high index of refraction (n>1) to enhance the optical power. The mold cavity has a feature to position the lead frame 104, and thus the die 100, with respect to a lens or diffractive optical element (doe) molding feature in the mold cavity. The lens or doe feature of the package 108 is located at a position over the die 100, so as to create the desired focus on the die and the appropriate distance $L_F$ or focal length for the optical system. In a preferred embodiment of a system described below the focal length is about 5 mm (the distance between the chip surface and the optical surface 110 of the portion 108 of the package).

Figure 2:
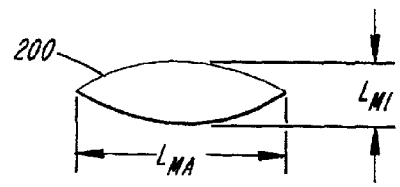
FIG. 2 is a plan view of an aperture structure which may be employed in the embodiments of FIG. 1 or 3.

A first molding compound is injected into the mold cavity to create a mechanical package for the delicate lead frame and die (and wire bonds) while also providing an accurately located focusing assembly. In a second molding process a second molding compound may be molded around the first to produce an opaque shell 112. An aperture 114 may be formed in the shell to admit light to be focused on the chip 100. In a preferred embodiment of the system described below using a linear array of rectangular pixels, the aperture may be elongated in shape. Such an elongated aperture 200 is shown in FIG. 2. The form of the elongated aperture may be a "cats-eye" shape having a major axis length $L_{MA}$ and a minor axis length $L_{MI}$. In a preferred embodiment, $L_{MA}$ may be 3 mm and $L_{MI}$ may be 1 mm. Alternatively, the aperture may be circular, rectangular or elliptical with various dimensions and aspects ratios, selected in accordance with the function of the device and the F-number desired for the system.

An illuminator may be fabricated using similar techniques. In such a case, a light emitting semiconductor die essentially replaces the photo sensor die 100 on a lead frame 104. Assembly then follows the same process utilizing lens and aperture features suitable for the illumination needs as well as the need to control unwanted stray light emissions.

Figure 3:
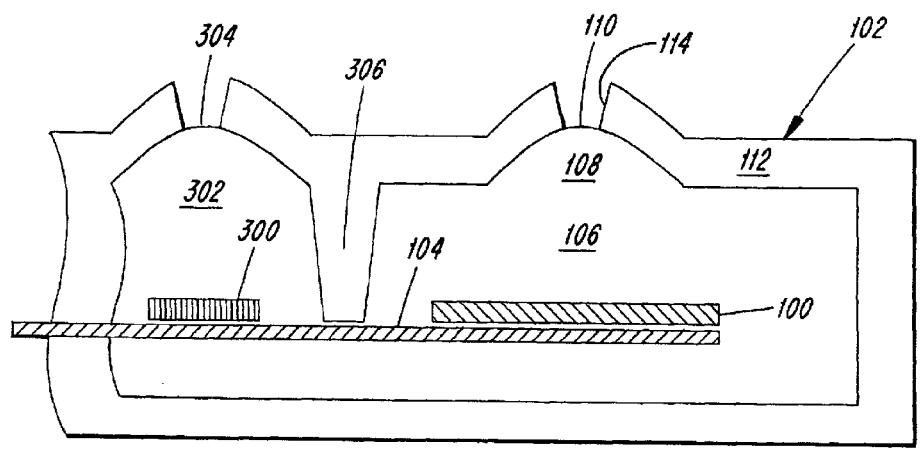
FIG. 3 is a cross-sectional view of a molded imager optical package with a light source, in accordance with another preferred embodiment of the present invention.

FIG. 3, illustrates a further embodiment of the present invention which includes the photo sensor die 100, lead frame 104, first transparent molded body 106, focusing feature 108, optical surface 110 and shell 112 with aperture 114 formed therein. A second die 300 may also be mechanically and electrically attached to lead frame 104. In preferred embodiments the second die is an LED used for illumination or aiming. The first transparent molded body includes a portion 302 which encases the die 300 and provides a second optical element (lens surface or doe) 304 for focusing light produced by the LED.

The imager/illuminator assembly of FIG. 3 thus combines two or more die on the same lead frame and molded in the same two step process. Undesirable light coupling between the illumination die and the photo sensor die may be controlled within the package. More specifically, an opaque light blocking portion 306 between the illuminating die 300 and the photo sensor die 100 may be formed when molding the shell 112 as shown in FIG. 3.

In both embodiments of FIGS. 1 and 3 the final assembly may be further processed to form the lead frame for subsequent mounting in the final product, for example, for mounting to a circuit board.

II. Miniaturized Linear Sensor-Based Code Reading Engines

Off-the-shelf image detectors used in bar code readers typically have large numbers of cells. Such readers use hardware digitizers to digitize the image signal in real time so that it does not have to be stored in memory. If fewer cells are used, they will collect more light and minimize the auxiliary illumination required. However, fewer cells introduce blur in the image which may not be tolerated by conventional hardware digitizers.

Contemporary, inexpensive microprocessors have enough computing power to execute sophisticated image processing algorithms in real time. An example of such a digitizer is disclosed in U.S. patent application Ser. No. 09/096,164 to He et al. filed Jun. 12, 1998 entitled "Digitizing Bar code Symbol Data" and assigned to Symbol Technologies, Inc. The He et al. application is hereby incorporated by reference herein. This high blur digitizer can easily run on a 16-bit, 20 MHZ microprocessor in hundreds of milliseconds or less. Furthermore, the microprocessor has sufficient on-chip RAM to process image containing up to about 1000 pixels.

Using such a sophisticated software digitizer the number of cells needed in the photo sensor can be reduced to several hundred (of course, more cells can be used for increased range). One advantage of using a small number of cells is that each cell receives more light from a fixed field of view compared to a system with a larger number of cells. Another advantage is that a photo sensor with fewer cells is simpler to build and lower cost. In addition the memory requirements of the system are reduced.

Software digitizers of the above-mentioned type are designed to operate on highly blurred images. This means the system can tolerate a small F-number and still have adequate working range. F-number is the conventional measure of relative aperture of the system. For the case of lens system with a circular pupil of diameter D, the F-number is defined as:

$$F-\text{number} \equiv \frac{f}{D}$$

where f is the focal length of the lens system. In preferred embodiments of the present invention f is less than about 15 mm, preferably less than about 5 mm; D is less than about 1 mm; and thus F-number is less than about 15, preferably less than 5 to 10, more preferably less than about 3.

A small F-number allows the system to operate with ambient light only, so that auxiliary illumination may not be required. The amount of light impinging on a photo detector is proportional to:

$$\frac{1}{(F-\text{number})^2} * (\text{scene illumination})$$

The use of a small F-number for a system such as a bar code reader that requires significant depth of focus is counterintuitive The high blur digitizer also enables the system to use a detector with very tall cells (as much as 20:1 ratio of height to width). This improves the sensitivity of the system because each cell collects more light. The advancement of CMOS technology for manufacturing imaging devices in recent years enables the cost effective development and volume production of such custom linear detector arrays.

Figure 4:
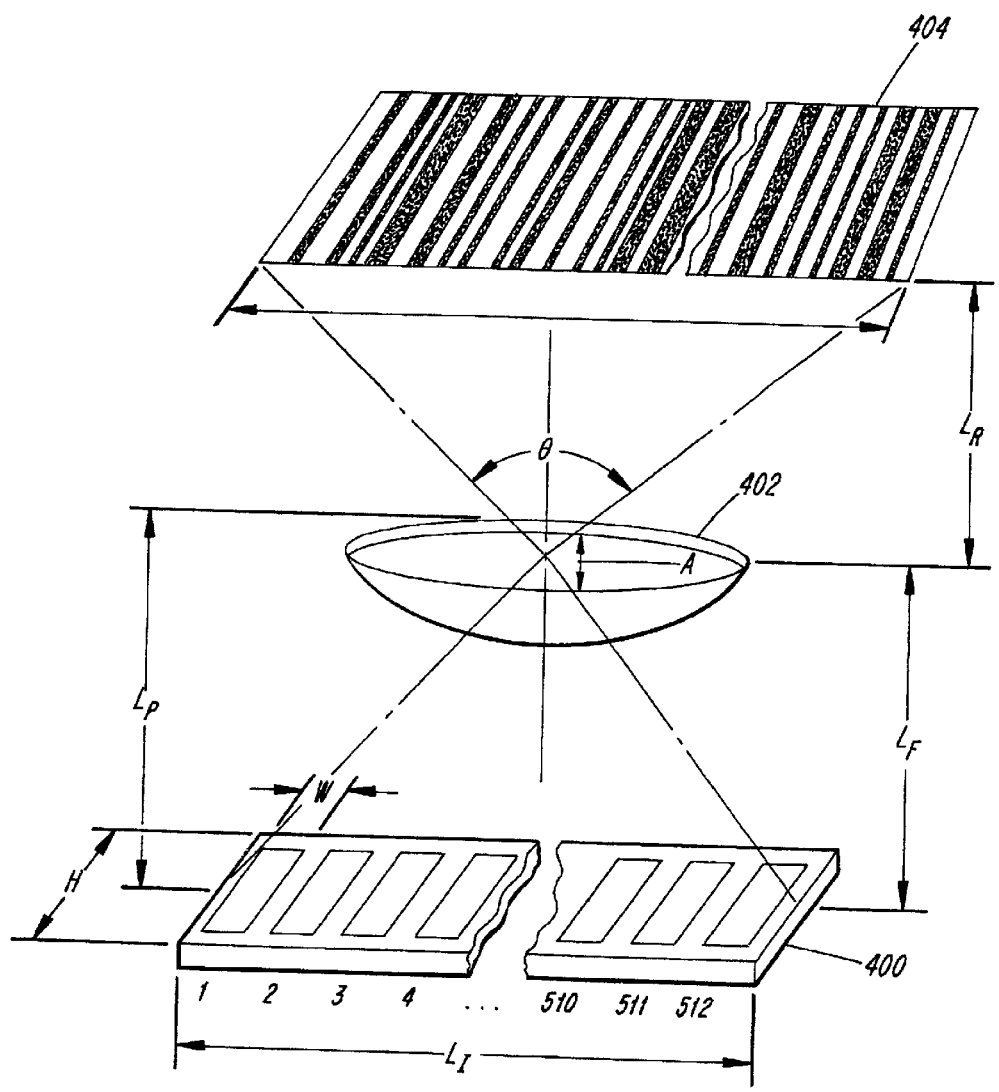
FIG. 4 is a pictorial schematic view (not to scale) illustrating certain features of a linear sensor-based code reading engine embodiment of the present invention.

An example of an embodiment of the present invention is illustrated in FIG. 4. A solid state photo sensor 400 used in the system may contain, for example, a linear array of 512 rectangular cells. The cells may have a height H to width W ratio of as much as 20:1. In one embodiment the pixels may be 8 $\mu$m wide and 120 $\mu$m tall. Another embodiment employs 8 $\mu$m wide by 65 $\mu$m tall pixels.

The preferred embodiment of FIG. 4 employs a photo sensor 400 with 512, 8 $\mu$m wide by 125 $\mu$m tall cells. An objective lens 402 and target bar code symbol 404 are also shown. The image length $L_I$ is about 4 mm. For a field of view $\theta$ of 40 degrees, the focal length $L_F$ is about 5 mm. This results in a minimum package dimension $L_P$ of 6 mm, a lower bound on the physical volume of an engine with this detector is about 0.22 cm$^3$, i.e., significantly less than one cubic centimeter. This engine is 50 times smaller than can be achieved with off-the-shelf CCD detectors which are used in conventional scanners. Alternatively, a 1000 cell (or larger) detector can be used with a small aperture and auxiliary illumination to achieve working ranges of 20 inches on 100% UPC.

The small number of tall cells combined with a small F-number permits a system optimized for performance and miniaturization. Such a system can operate down to 1 lux of ambient light with no auxiliary illumination.

With a 40 degree field of view, 512 cells and a 1 mm wide aperture the optimum working focal distance $L_R$ for 6.6 mil codes is estimated to be 3.1 inches with an estimated working range of 1.5 to 4.6 inches. For 100% UPC code, $L_R$ is estimated to be 4.3 inches with an estimated working range of 1.8 to 6.1 inches. This system has 0.7 inches of working range on 2 mil codes. With integration times from 1 ms to 30 ms and two gain settings (unity and 30) the system can operate in ambient lighting as low as 0.4 fc (footcandles) at the in-focus position and 5 fc at the out-of-focus limit, assuming 35% minimum reflective difference, 24 dB minimum Signal-to-Noise Ratio (SNR) at the out-of-focus limit and 12 dB minimum SNR at the in-focus position. Typical home lighting is 20 to 50 fc, typical office lighting is 100 fc and direct sunlight is 9000 fc, all which would provide more than enough ambient light for the system to function.

System parameters are chosen such that the high blur digitizer provides adequate working range in minimal lighting conditions. The detector array parameters are based on an existing and proven solid state sensor design. Improvements to the minimum required ambient light can be made at the expense of working range and/or tolerance to rotational misalignment. For consumer scanning systems where long working range is not required, a system with a medium blur digitizer can be designed by decreasing the aperture to match the performance of a system with the high blur digitizer. However, with respect to working range the high blur digitizer enables greater freedom in trading off range for minimum lighting requirements compared to a system with a medium blur digitizer.

The one-dimensional imaging system may use a CMOS detector with 512 cells and an image length of 4 mm as noted above. The focus length required for a field of view of 40 degrees is about 5 mm. With a 1 mm wide by 3 mm high aperture the effective F-number of the system is 2.6. The system needs a small fraction of the light (~0.015) compared to CCD-based systems to achieve similar signal-to-noise and can operate down to 0.4 fc ambient light, and therefore does not require auxiliary illumination.

The imaging system parameters used in this analysis are summarized as follows:

| | |
|---|---|
| Field of View | 40 degrees |
| Focus distance | 3 inches (76.2 mm) |
| Detector length | 4 mm |
| Focal length | 5.12 mm |
| Aperture size | 1 mm wide by 3 mm high |
| Number of cells | 512 |
| Cell width | 7.8 $\mu$m |
| Cell height | 125 $\mu$m |
| Quantum efficiency | .2 (a typical value for a CMOS process) |
| Conversion gain | 3.2 $\mu$V/electron |
| Dark current | 19 mV/second |
| Saturation level | 800,000 electrons |
| Cell capacitance | 50 fF |
| KTC noise | 90 electrons rms @ 300K |

Many conventional CCD-based one-dimensional imagers utilize hardware digitizers similar to a flying-spot laser bar code reader. Hardware digitizers typically produce a single bit of quantization, and are limited in complexity compared to software digitizers. Hardware digitizers can handle very little blur; thus, the existing CCD-based systems have a very large F-number to achieve large depth of focus. The CCD-based system needs very high resolution due to the low signal (large F-number) and hardware digitizer. Novel algorithms, such as the high blur digitizer of the above-mentioned He et al. application, enable sufficient performance with only 512 cells as opposed to several thousand cells required in conventional one-dimensional images. With an aperture width of 1 mm all bar code densities lower than 5 mil have blur limited (not cell per module limited) working range.

The He et al. digitizer contains three separate digitizers: low blur, medium blur and high blur. The low blur algorithm uses an adjustable thresholding scheme and requires about 80% modulation in the highest spatial frequency of the received signal. The medium blur algorithm uses a more complicated thresholding scheme and requires about 30% modulation in the highest frequency. The high blur digitizer requires about 30% modulation in the second highest spatial frequency and infers the highest frequency edges from this information.

Working range of a bar code reader depends on a number of factors including bar code density, field of view and blur limits of the system. For example, using the above described system the calculated achievable working range for a bar code of 6.6 mil density is between 1.5 and 4.6 inches assuming digitization sufficient to tolerate a pixel per model ratio of less than one. It has been determined that a system with this working range could be implemented with a solid state detector with as few as 400 cells.

Computing signal as a function of ambient illumination is complicated due to the multiwavelength nature of ambient light and the different spectral characteristics of the numerous light sources (e.g., several different fluorescent lights and incandescent lights). The model used here assumes that the light source is monochromatic (550 nm) to simplify the computation. Fluorescent lights have a strong component at 550 nm, but most of the energy of incandescent light is in the red and near infrared. Thus, the results presented here are most accurate for fluorescent lighting, but represent worst case conditions in general. For incandescent lighting the minimum lighting requirements are much less than predicted by this computation.

Figure 5:
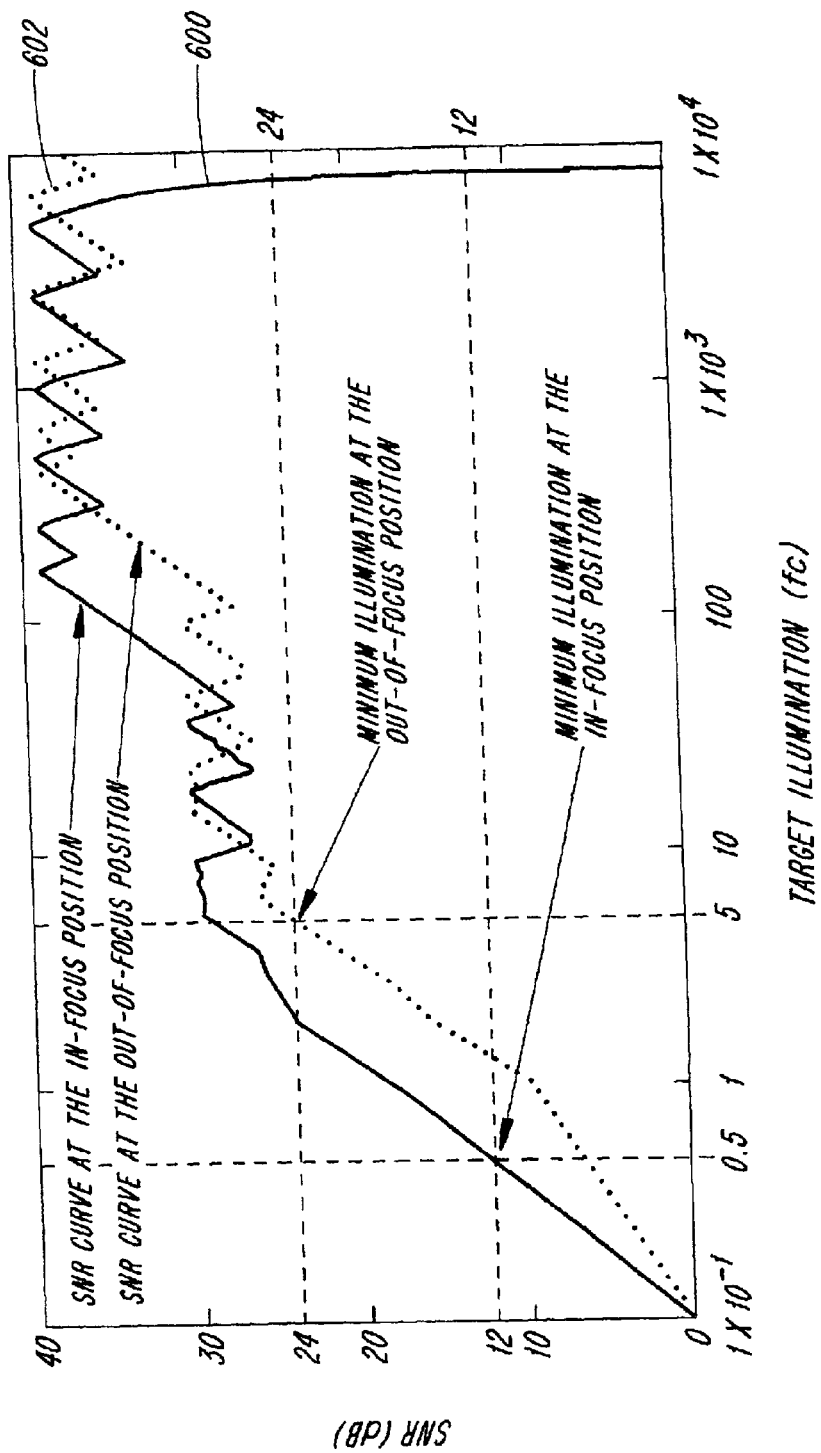
FIG. 5 is a graph illustrating the relationships of focus position, signal-to-noise ratio and target illumination associated with certain embodiments of the present invention.

The calculated signal-to-noise ratio of the above described one-dimensional photo sensor system is presented in FIG. 5 as a function of target illumination for 6.6 mil symbols at the in-focus position (solid curve 600) and the out-of-focus limit (dashed curve 602).

A summary of ambient lighting requirements for several bar code densities is given in the following Table I.

TABLE I

| Bar code density | Range of ambient lighting (fc) | | | |
|---|---|---|---|---|
| | In-focus position | | Out-of-focus limit | |
| (mils) | Low | High* | Low | High |
| 5 | .6 | 9000 | 5 | 9000 |
| 6.6 | .5 | 8100 | 5 | 9000 |
| 7.5 | .45 | 7700 | 5 | 9000 |
| 10 | .4 | 7000 | 5 | 9000 |
| 100% UPC | .4 | 6700 | 5 | 9000 |
| 20 | .4 | 6500 | 5 | 9000 |

*This ambient light limitation can be increased by permitting integration times smaller than 1 ms.

For this example the detector array has a cell height of 125 $\mu$m which corresponds to a detector footprint of 1 mm on the object at the in-focus position. If the detector array is misaligned with the bar code, then the blur due to cell averaging is increased. The imaging system proposed here can tolerate up to 17 degrees rotation on 6.6 mil codes and 40 degrees rotation on 100% UPC. Working ranges for several rotation angles are given in the following Table II.

TABLE II

| | Working range (inches) | | | | | |
|---|---|---|---|---|---|---|
| Density | 6.6 mil | | | 13 mil (100% UPC) | | |
| Rotation angle (degrees) | Near | Far | Range | Near | Far | Range |
| 0 | 1.5 | 4.6 | 3.1 | 1.8 | 6.1 | 4.3 |
| 5 | 1.5 | 4.4 | 2.9 | 1.8 | 5.9 | 4.1 |
| 10 | 1.6 | 3.9 | 2.3 | 1.8 | 5.5 | 3.7 |
| 15 | 1.9 | 3.2 | 1.3 | 1.8 | 4.8 | 3 |
| 17 | 2 | 2.8 | 0.8 | 1.8 | 4.6 | 2.8 |
| 20 | | | | 1.8 | 4.3 | 2.5 |
| 25 | | | | 1.8 | 3.8 | 2 |
| 30 | | | | 1.8 | 3.3 | 1.5 |
| 35 | | | | 1.8 | 2.9 | 1.1 |
| 40 | | | | 1.8 | 2.5 | 0.7 |

Tolerance to rotational misalignment can be traded off for required ambient lighting by varying the cell height. Because cell size affects cell capacitance (and therefore conversion gain and KTC noise) the tradeoff of cell height must be analyzed in the context of the sensor electronics design.

The linear sensor-based code reading engines of the present invention may be implemented using the molded optical packages described in connection with FIGS. 1, 2 and 3. Alternatively, such engines can be constructed in the fashion illustrated in FIGS. 6 and 7.

Figure 6:
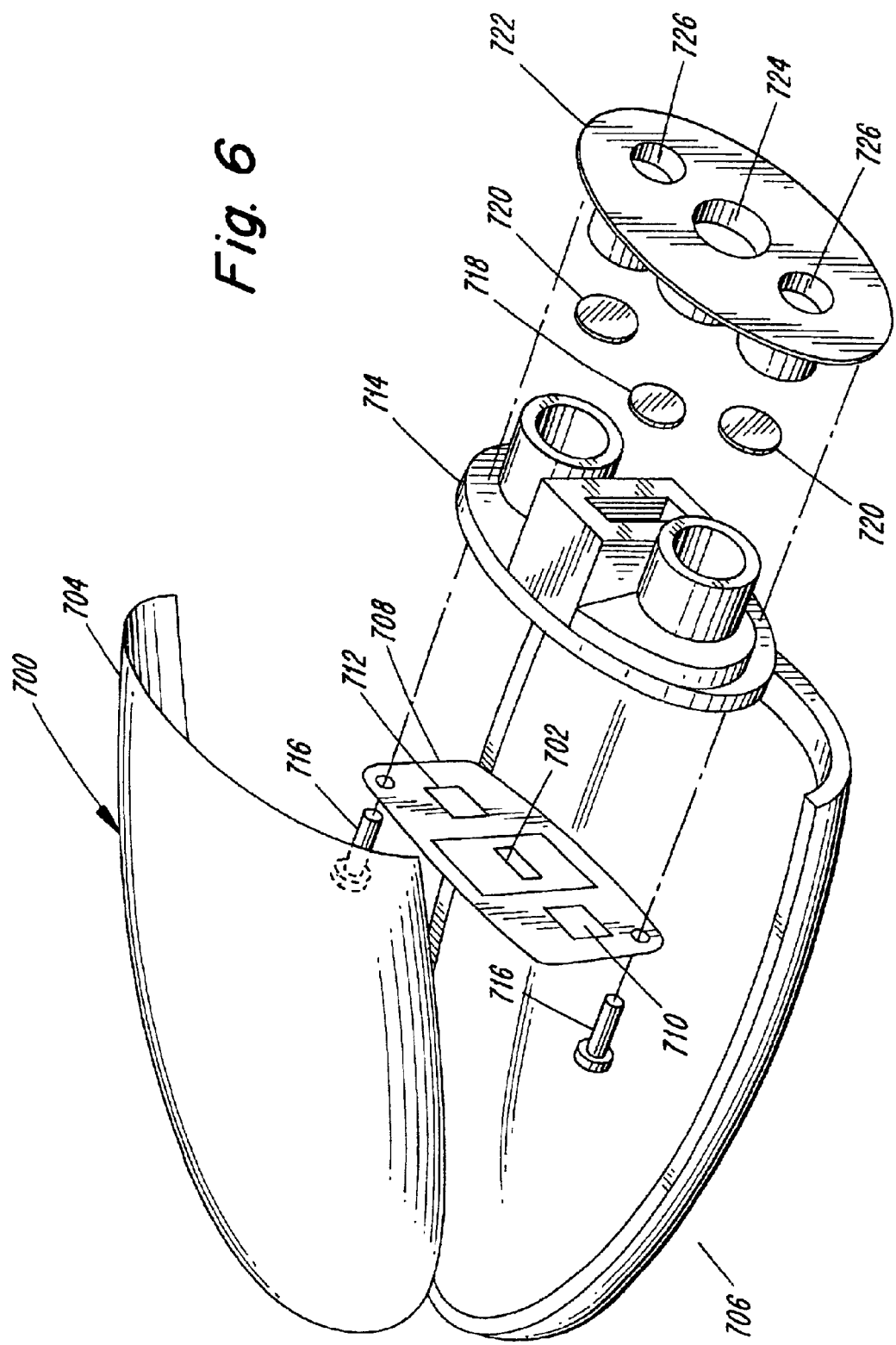
FIG. 6 is an exploded pictorial view of a hand held optical code imager embodiment of the present invention.

FIG. 6 is an exploded pictorial view of a handheld optical code imager 700, employing a solid state one-dimensional photo sensor 702. The imager assembly includes housing halves 704 and 706 for containing a circuit board 708 to which the photo sensor 702 is attached and electrically connected. The circuit board may also carry solid state aiming or illumination devices such as LEDs or laser diodes 710 and 712.

The circuit board 708 may be mechanically attached to housing front member 714, for example, by fasteners 716. Imager lens 718 and illumination or aiming lenses 720 may be held in position in or against the housing front member 714 by housing face member 722. Aperture 724 admits the light sensed by the photo sensor 702. Aiming or illumination light exits the imager housing through apertures 726.

Figure 7:
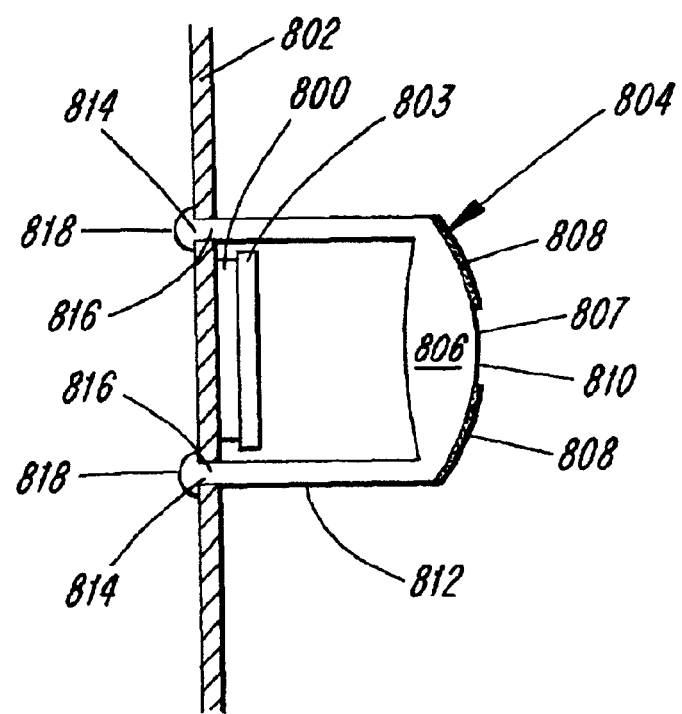
FIG. 7 is a cross-sectional view of a photo sensor optical assembly embodiment of the present invention.

FIG. 7 illustrates a further alternative structure for the photo sensor optical assembly. A solid state sensor die 800 such as a linear array detector may be surface-mounted on a circuit board 802. A glass cover slip 803 protects the optically receptive surface of the die 800. A molded transparent plastic cap 804 includes an objective lens portion 806. The system aperture 807 may be defined by an opaque layer 808 on the lens surface 810, or by the cylindrical sleeve portion 812 of the cap 804. The cylindrical sleeve 812 may be formed with attachment pins 814 which may be inserted into corresponding holes 816 in the circuit board 802. The ends 818 of the pins 814 may be heat-flaired to hold the cap in position with respect to the solid state sensor die 800 and, thus maintain the correct focal length for the system.

III. Omni-Directional Imager

As discussed above a CMOS single line sensor array with about 500 to 1000 cells can be used to make an inexpensive bar code scanner that uses ambient illumination and can achieve several inches of working range on UPC. This system may use a microprocessor with an on-board A to D convertor to load the analog signal from the CMOS array into memory, and then decode the symbol from this data. However, as indicated in Table II above, such systems are limited by their rotation angle of a principle axis of the line sensor with respect to the principle axis of the one-dimensional bar code symbol being read.

In a further preferred embodiment, plural line sensor arrays, oriented at angles with respect to one another are employed to provide an omnidirectional code reader. Each line sensor array and converter is sufficiently inexpensive that several of them can be used to build a code reader at a cost comparable to that of a conventional POS single line laser scanner. It will therefore be relatively inexpensive to build a hand held scanner that contains three or four or more of these arrays, each of which is oriented differently, so they can scan a symbol at different angles. For example, a scanner can be built that has three sensor arrays. One may be oriented horizontally to read a symbol in picket fence orientation. One may be rotated 60 degrees from the horizontal, and the third rotated 60 degrees in the opposite direction from the horizontal. If an aiming spot is centered at the junction of the three scan lines, the scanner will be able to read a UPC symbol in any orientation as long as it is positioned such that the aiming spot is near the center of the symbol.

The decoding electronics for each system may consist of four conventional microprocessors such as are used singly in conventional consumer scanners. One microprocessor may be assigned to each sensor array, each of which will detect UPC blocks and/or half blocks and transmit them to the fourth microprocessor, which may select one or more images and stitch them together into a single symbol. The fourth microprocessor may also be used to control an audible indicator and decode LED indicators, and may transmit the decoded symbol to a host terminal. Alternatively, a single higher power microprocessor may be used with an on-board A to D convertor and analog switches to connect its input to the three sensors consecutively.

The signals from the multiple sensor arrays can be combined to decode a bar code that is positioned such that only part is visible to one array, and another part of the symbol is visible to another array. UPC/EAN code is designed to be easily decoded even when a single scan line, or sensor array in this case, doesn't see the entire symbol. Pieces of the symbol seen by different sensor arrays can be combined into the entire symbol. To do this, one microprocessor must have access to all of the symbol fragments detected by the different sensor arrays. This will happen naturally if the decoder uses a single microprocessor that receives data sequentially from each sensor array. In this case, all of the data from all the sensors can be easily placed into a memory array, and the microprocessor can look through this array for all of the fragments of symbols and combine them. The system might also be built using an individual microprocessor for each sensor array. In this case, if any sensor array sees an entire symbol, it can decode it all by itself. If, however, each array only sees fragments of symbols, all of these fragments will need to be placed in a memory array where one microprocessor can access them all, so that it can combine them into a single bar code. A good way to do this is to assign the job of combining symbol fragments to one microprocessor. The other microprocessors will send any symbol fragments that they have detected to this microprocessor so it can combine them. This can be done if the multiple microprocessors use shared memory. Alternatively, the microprocessors can transmit the fragments from one to the other. The microprocessor that combines the fragments can also be used to run the digitizer algorithm for one array, or it can be a microprocessor whose only job is to combine fragments. In either case, when fragments are combined into a whole symbol, the microprocessor that has done this can control the audible indicator, decode LED, interface to the host point-of-sale system, etc.

Each line sensor assembly, may consist of a photo sensor array, a focusing lens, a microprocessor and associated electronic components. Using such line sensor assemblies, it is possible to build a very inexpensive omnidirectional code reader.

In conventional consumer scanning systems, the system typically scans at 30 scans per second. Consistent with this, if three line array sensors are used in embodiments of the present invention, the total scan rate would be 90 scans per second. If higher scan rates are desired, it will be necessary to give up the ability to read in very low ambient light levels. Alternatively, depth of focus can be increased by requiring higher light levels. This tradeoff may be appropriate for point of sale code readers which are typically used in high light environments.

FIG. 8 illustrates the structure of a handheld, omnidirectional optical code reader embodiment of the present invention. FIG. 8(a) is a side cross-sectional view of the code reader. The code reader 900 may include a housing 902 and a printed circuit board 904. The housing may include a scanner head portion 906 and a backwardly and downwardly sloping handle portion 907 adapted to be gripped in the hand of the operator. A trigger 908 may be used to actuate functions of the device including the code reading function. FIG. 8(b) is a front view of the code reader 900. FIG. 8(c) is a plan view of the circuit board 904. The circuit board may carry linear sensor assemblies 910, aiming LEDs or laser diodes 912 and illumination LEDs 914. A switch 916, also carried by the circuit board 904, may be actuated by the trigger 908.

The straight line sensor arrays 910 are shown oriented at 60° angles with respect to one-another in an equilateral triangular array. It will be understood that other line shapes, cell arrangements and numbers of linear sensor arrays may be employed to obtain omnidirectional performance. Examples of several alternative arrangements are illustrated in FIGS. 9 and 10 discussed below.

Figure 8A:
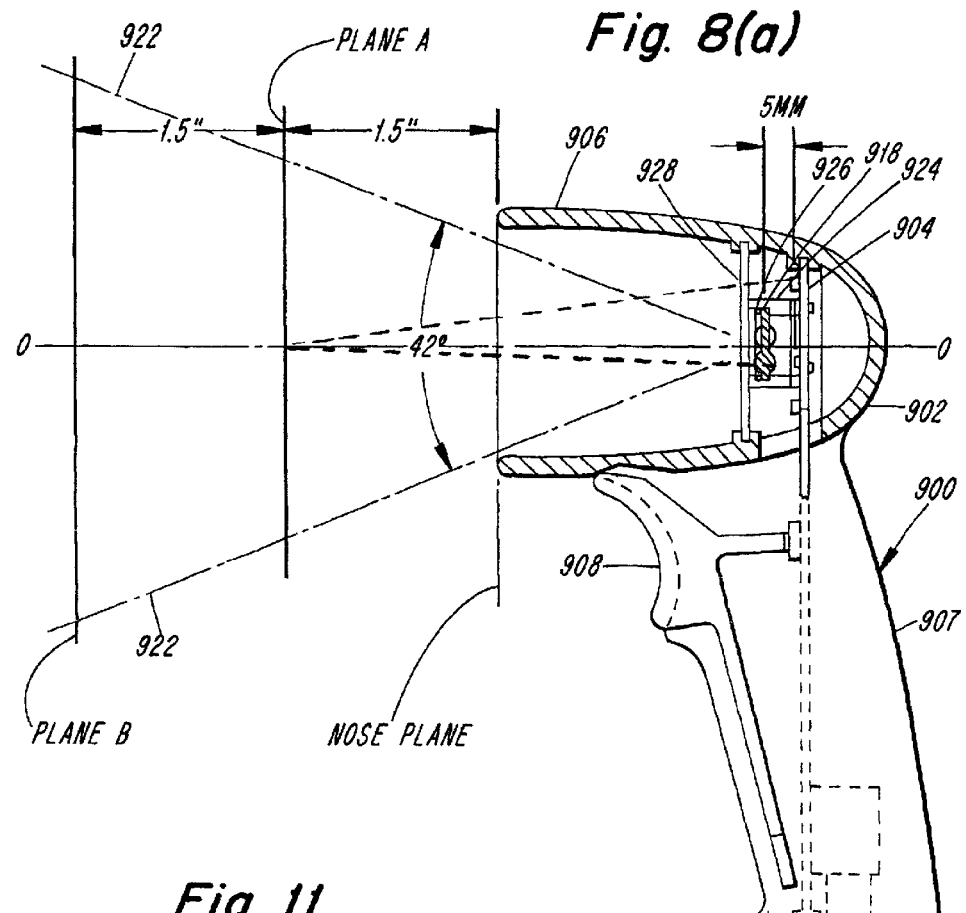
FIGS. 8(a) and (b) are, respectively, side cross-section and front views of an omnidirectional code reader embodiment of the present invention.
Figure 8B:
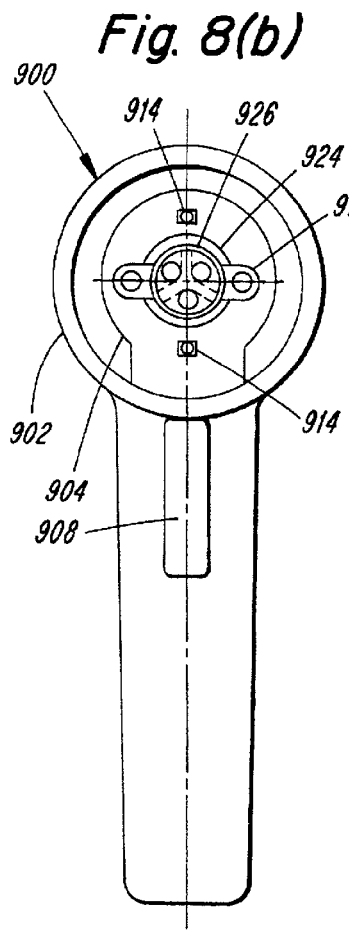
FIG. 8(c) is a plan view of a circuit board and line sensor arrays of the embodiment of FIG. 8(a).
FIG. 8(d) is a detail of a lens assembly employed in the embodiment of FIGS. 8(a)–(c).
Figure 8C:
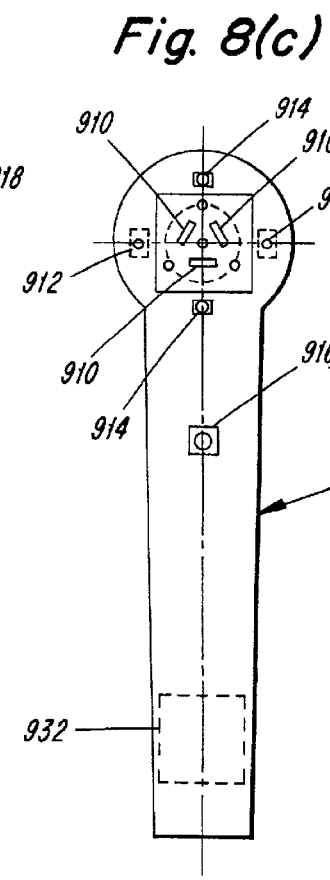
Figure 8D:
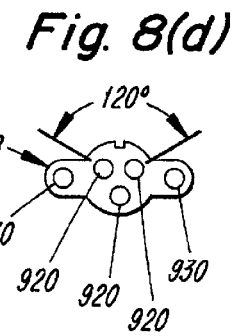

FIG. 8(d) is a plan view of a lens assembly 918 for focusing an image of a target optical code on the linear sensors 910 of the embodiment of FIG. 8(c). Each of three lenses 920 are associated with one of three sensors 910. In a preferred embodiment each lens is 3 mm in diameter with a 5 mm focal length. Centers of the lenses lie on radials from the geometric center of the assembly spaced 120° from one another. Alternatively, three packaged modules of the type described in connection with FIGS. 1–3 may be employed to provide both the necessary optics and electronics in one package.

Figure 11:
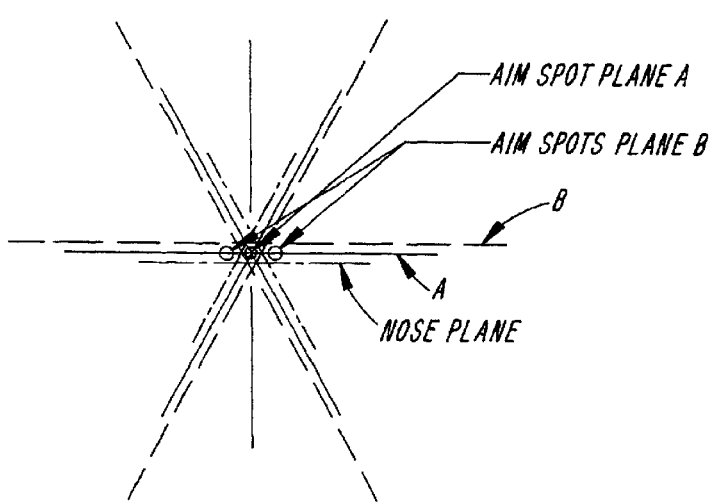
FIG. 11 is a diagram illustrating the positions of projected aiming spots employed in a preferred embodiment of the present invention.

The lenses 920 focus images on their respective sensors 910. The lenses are not necessarily positioned directly over the detector arrays. Advantageously, the lenses may be shifted slightly towards the center of the triangle so that all of the scan lines converge and cross at a center point at a preferred distance from the scanner. This is illustrated in FIG. 11. Alternatively, the lenses can be positioned directly above the sensors, but there will then not be any distance at which all the lines cross at a single point.

The system may be designed, for example, to produce a scan field of 42° with scan boundaries 922 as shown in FIG. 8(a).

Aspects of the mechanical assembly of the code reader are best illustrated in FIG. 8(a). The printed circuit board 904 carries a cylindrical tube 924. The lens assembly 918 is held in place in the tube by a retaining ring 926. A transparent window 928 overlies the lens assembly. Alternatively, structures similar to that shown in FIGS. 6 and 7 may be employed, the structures being adapted to include three or more line sensors and corresponding three or more lens in the cap or housing.

FIGS. 9(a)–(d) are examples of various arrangements of photo sensor arrays which may be used to obtain omnidirectional code reading. In preferred embodiments the arrays are solid state photo sensor arrays 910 having cells arranged in a generally straight lines. In the examples of FIG. 9, the arrays are each formed on a separate semiconductor chips or dies.

Figure 9A:
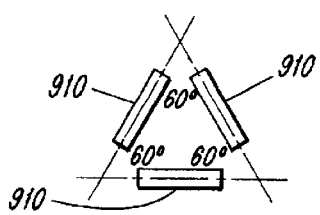
FIGS. 9(a)–(d) are examples of various arrangements of photo sensor arrays employed in embodiments of the present invention.
Figure 9B:
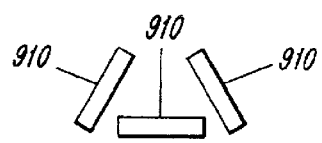
Figure 9C:
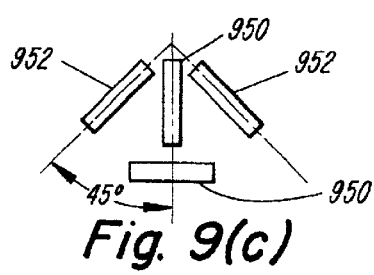

FIG. 9(a) shows an arrangement where the three photo sensors lie along each side of an equilateral triangle and their principle axes intersect one another at 60° angles. FIG. 9(b) is variant of this arrangement in which the arrays are not centered on the sides of the equilateral triangle as they are in FIG. 9(a). In FIG. 9(c), four line sensors 910 are employed. Sensors 950 are perpendicular to one another and sensors 952 are perpendicular to one another. The one pairs of sensors is rotated 45° with respect to one another. It will be understood that the maximum rotational offset of any of the four sensors from the principle axis of a one-dimensional bar code will be no more than 22.5° when the arrangement of FIG. 9(c) is used.

Figure 9D:
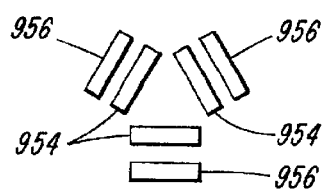

FIG. 9(d) shows an arrangement where three line sensors 954 lie along the sides of an equilateral triangle and three additional line sensors 956 lie along the sides of a larger equilateral triangle. The latter line sensors may be selectively used when the code symbol to be read is at a greater distance from the plane of the sensors.

FIGS. 10(a) and (b) are examples of embodiments in which multiple line sensors 910 are formed on the same semiconductor die 958. In these embodiments supporting circuitry for the photo sensors may be located in the space on the die in between or adjacent to the photo sensor arrays such as in the regions indicated by the numeral 960. Such an arrangement may be used to reduce the cost and size of the sensing system and the area of silicon on which it is formed. Such die could contain one or more microprocessors and provide completely decoded data as an output. In addition illumination or aiming light sources such as LED's 962 may be fabricated on the same chip. In this embodiment, the sensors and light emitters are self-aligned (i.e. they are manufactured in an aligned relationship by appropriate design of the chip fabrication masks). Manual alignment of separate components is, thus, not required during assembly of the code reader.

Given the relatively small size and two dimensional layout of the line sensors, it is beneficial for the target symbol to be located as close as possible to the center of the scanning field for effective operation. Preferably the target symbol should be centered on the central optical axis 0—0 of the system in a plane perpendicular to axis 0—0. Aiming spots or patterns may be provided for the purpose of centering the symbol in the field of view of the code reader.

In one embodiment a single aiming spot produced by an LED may be employed. This spot would be at the center of the scan field and the user would direct the aiming spot at the center of the target symbol. The single spot could be focused at the smallest optimum distance between the scanner nose and the target symbol. Alternatively, two or more aiming beams may be employed such that the beams coverage into a single spot at a point of optimum focus, for example two inches from the scanner nose. Such an arrangement would guide the user to both the proper centering and proper focal distance.

A preferred aiming system will now be discussed with reference to FIGS. 8 and 11. Two aiming LEDs 912 are employed. Beams from each are focused by aiming lenses 930. As shown in FIG. 8(c) the focusing and aiming spot lenses may be combined in a single molded optical assembly 918. The optical axes of the aiming beams may be tilted slightly toward the geometrical central axis 0—0 of the code reader. The angle of tilt is selected so that the spots converge at PLANE A as shown in FIG. 8(a). At a greater distance, for example PLANE B, the two spots are separated. The projections of the spots on the PLANES A and B are shown in FIG. 11. The lengths of the regions scanned by each line sensor are also shown in FIG. 11 for PLANES A and B and for the code reader NOSE PLANE.

Other aiming system may be implemented. For example a laser and holographic element may be used to project a circle which indicates the periphery 922 of the scan field and also projects a spot or plus shape in the center of the scan field.

It may also be desirable to provide supplemental illumination for the code reader. For example the system may employ a few, inexpensive illumination LEDs 914. These would be particularly valuable if the code reader is held so close to the symbol that the housing casts a shadow on the symbol. At larger working ranges the code reader may use ambient light.

The code reader may be adapted to be selectively positioned in a cradle or a scanstand. Electrical contact with a host terminal can be provided by means of a jack 932. In use the user would position the symbol under the scanner by observing the aiming spot and positioning it on the center of the symbol. It will be desirable for the aiming spot to be on continuously during positioning, so the user can easily see where to position the symbol. It would probably also be acceptable to have the aiming spot continuously illuminated when the system is in hand held trigger operated mode. However, the aiming spot will only appear to be on continuously. It will actually have to blink off briefly each time an image is to be captured so that the aim spot does not show up on the image. This means that it will blink on and off, for example, at 90 times a second which, to a user, will appear like continuous illumination. In this situation, the user would position the spot on the symbol, and then pull the trigger to initiate code reading. Alternatively, the scanner may operate continuously, without trigger activation in both handheld and scanstand mode.

FIGS. 8(a), 8(b) and 8(c) all show that the code reader 900 can be built by mounting the sensor arrays and their associated optics and electronics all on a single-circuit board 904. The board also may carry illumination LEDs 914 (if needed), indicator LEDs that blink when a decode occurs, the jack 932 for a cable that runs to the host system, the trigger switch 916, an audible signal annunciator, etc. FIG. 8(a) also shows how the handle of the housing can be sloped backwards at the bottom, as is required for a relaxed hand position when scanning, even though the circuit board extends straight down into the handle. As shown in FIG. 8(a) the principle plane P of the circuit board 904 may be located at an acute angle φ with respect to the handle portion of the housing. This arrangement will also work well for a code reader with only a single line sensor that is incapable of omnidirectional reading.

There have been CCD based scanners in the past that have placed all circuit components on a single board, but the board was positioned in a plane essentially parallel to the plane of the field of view of the sensor. For example, many of the numerous CCD contact reading scanners are built this way. Several manufactures have produced gun-shaped CCD code readers which have most of the electronics on a horizontal circuit board located in the head of the gun. These scanners, however, have also employed a second board in the handle to support a connector at the bottom of the handle into which the interface cable is plugged. A ribbon cable generally connects the head circuit board with the handle board.

The configuration of the present invention combines the electrical interconnections in a single vertical board in a gun-shaped housing. This provides the best ergonomics for a non contact scanner without adding costs, such as extra connectors, ribbon cable and the added costs associated with a two board system. Such a configuration could also be employed in a laser beam scanner in a similar fashion.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. An apparatus for an optical code reader comprising:
   first solid state photo sensor array having cells arranged in a line along a plane of the array for producing electronic signals corresponding to an image of at least a portion of a target optical code symbol;
   a second solid state photo sensor array having cells arranged in a line along a plane of the second solid state photo sensor array, vertical planes extending infinitely from the planes of the first and second solid state photo sensor arrays form an infinitely vertical volumetric space between each other, the second sensor array for producing electronic signals corresponding to at least a portion of a target optical code symbol; and
   electronic analog to digital converter means for converting electronic signals from at least one of said sensor arrays to bit content of a target optical code symbol to be read.

2. The apparatus of claim 1 further comprising a third solid state photo sensor array having cells arranged in a line along a plane of the third solid state photo sensor array, vertical planes extending infinitely from said plane of the third solid state photo sensor array substantially enclosing said infinitely vertical volumetric space.

3. The apparatus of claims 1 or 2 wherein the photo sensor arrays are formed on separate semiconductor dies.

4. The apparatus of claims 1 or 2 wherein all the photo sensor arrays are formed on the same semiconductor die.

5. The apparatus of claim 4 wherein space on the die adjacent to the arrays contains support circuitry for the arrays.

6. The apparatus of claim 2 wherein the lines of the three photo sensor arrays are oriented at an angle of about 60° with respect to one another.

7. The apparatus of claim 6 wherein the lines of each of the three photo sensor arrays lies along one side of an equilateral triangle, respectively.

8. The apparatus of claim 1 wherein the photo sensor arrays are each formed on separate dies and wherein an electric converter means for each array is a microprocessor formed on the respective dies on which the array is located.

9. The apparatus of claim 1 further comprising a first lens spaced within 10 mm of the first sensor array and a second lens spaced within 10 mm of the second sensor array.

10. The apparatus of claim 1 further comprising means for producing at least one aiming beam for providing a reference spot on the target optical code symbol to be read.

11. The apparatus of claim 10 wherein the aiming beam producing means and the sensor arrays are formed on the same semiconductor die.

12. The apparatus of claim 10 wherein the aiming beam producing means comprises at least two LEDs and associated lenses for producing beams which converge to form a reference spot at a preferred focal distance for reading the target optical code symbol.

13. A sensor assembly for an apparatus for reading a target one-dimensional optical code symbol whose principle axis has an arbitrary orientation in a plane generally parallel to an image plane of the sensor assembly comprising:

a first solid state photo sensor array having cells arranged in a generally straight line along a plane for producing an electronic signal corresponding to at least a portion of an image of the code symbol;

a second solid state photo sensor array having cells arranged in a generally straight line along a plane of the second solid state photo sensor array for producing an electronic signal corresponding to at least a portion of an image of the code symbol;

a third solid state photo sensor array having cells arranged in a generally straight line along a plane of the third solid state photo sensor array for producing an electronic signal corresponding to at least a portion of an image of the code symbol, wherein vertical planes extending infinitely from the planes of the first, second and third solid state photo sensor arrays form a substantially enclosed volumetric space with respect to one another;

means for focusing images of the target code symbol on each of the three sensor arrays; and means for converting to digital form electronic signals from the sensor assembly.

14. The sensor assembly of claim 13 further comprising electronic means for selecting data obtained from electronic signals from the sensor array whose line is most closely aligned with the principle axis of the target code symbol.

15. The assembly of claim 13 wherein the lines of the three sensor arrays are oriented at an angle of about 60° with respect to one another.

16. The assembly of claim 13 wherein each sensor array is formed on a separate die.

17. The assembly of claim 13 wherein the three sensor arrays are formed on the same die.

18. The assembly of claim 17 wherein supporting circuitry is located in the space on the die adjacent the sensor arrays.

19. The assembly of claim 13 wherein the focusing means includes three lens, each one of which having an optical axis which approximately intersections a mid point of the line of it respective sensor array.

20. The assembly of claim 19 wherein the three lenses are integrally formed on an optical plate located within 10 mm of the image plane of the sensor array.

21. An apparatus for an optical code reader comprising:

at least three one-dimensional solid state sensor elements each having an array of cells, each array located along a plane, wherein an infinite extension of each plane along both directions of a horizontal axis thereof forms at least one intersecting angle with respect to one another;

electronic analog to digital converters associated with each one-dimensional solid state sensor elements for converting electronic signals from the photo sensor to digital form; and means for selecting a signal from one of the analog to digital converters representative of the data content of a one-dimensional target bar code whose principle axis is sufficiently aligned with the axis of the corresponding array to permit data to be extracted.

22. The apparatus of claim 21 wherein data content from more than one of the sensor elements is combined to decode a bar code that is positioned such that only a part of the bar code is readable by each sensor element.

23. An optical code reader comprising:

a gun-shaped housing comprising a head portion containing a sensor assembly for reading an optical code located forward of an in the vicinity of an optical axis of a sensor assembly, said sensor assembly including at least two sensor elements each having an array of cells, each array located along a plane, wherein an infinite extension of each plane of the at least two sensor elements along both directions of a horizontal axis thereof forms at least one intersecting angle with respect to one another, said housing further comprising a handle portion sloping backwardly and downwardly from the head portion, said handle portion having a trigger for actuating the optical code reader; and a circuit board generally perpendicular to the optical axis of the sensor assembly extending through the head portion and through at least a portion of the length of the handle portion of the housing for carrying the sensor assembly.

24. The optical code reader of claim 23 wherein the circuit board carries at least one interface connector located at a lower end of the handle portion of the housing.

25. The optical code reader of claim 23 wherein the circuit board carries a trigger switch actuated by squeezing the trigger.

26. The optical code reader of claim 23 wherein a portion of the circuit board located in the head portion of the housing carries electronic illumination devices.

27. The optical code reader of claim 23 wherein a portion of the circuit board located in the head portion of the housing carries plural, separately packaged solid state sensor arrays.

28. The optical code reader of claim 23 wherein a portion of the circuit board located in the head portion of the housing carries at least one aiming LED.

29. The optical code reader of claim 23 wherein a portion of the circuit board located in the head portion of the housing carries at least one indicator LED.

30. The optical code reader of claim 23 wherein a portion of the circuit board carries an audible signal generator.

31. The optical code reader of claim 23 wherein a principle plane of the circuit board is located substantially parallel to a plane of the field of view of the code reader, and at an acute with respect to the handle portion of the housing.

* * * * *